United States Patent [19]
Laney

[11] Patent Number: 5,248,850
[45] Date of Patent: Sep. 28, 1993

[54] ELECTRICAL BOX CONNECTOR CONDUIT

[76] Inventor: Robbye J. Laney, 10116 San Gabriel Rd. NE., Albuquerque, N. Mex. 87111

[21] Appl. No.: 906,099

[22] Filed: Jun. 29, 1992

[51] Int. Cl.[5] .................. H02G 3/06; H02G 3/08; F16L 55/00
[52] U.S. Cl. ........................ 174/65 R; 174/51; 174/59; 174/62; 174/86; 285/20; 285/32; 285/161; 285/298
[58] Field of Search ............... 174/59, 61, 62, 64, 174/65 R, 65 SS, 51, 86; 285/19, 20, 31, 32, 161, 206, 298, 302, 404

[56] References Cited

U.S. PATENT DOCUMENTS 2,397,290  3/1946  Rasmussen .................. 285/206 X
3,907,334  9/1975  Schera, Jr. ..................... 285/20

Primary Examiner—Leo P. Picard
Assistant Examiner—Hyung S. Songh
Attorney, Agent, or Firm—Leon Gilden

[57] ABSTRACT

An electrical box connector conduit is fixedly mounted between adjacent electrical boxes through aligned box bores. The conduit structure includes a central conduit member having first and second abutment flanges mounted fixedly to the first and second ends of the conduit member. The conduit member is internally threaded to threadedly receive first and second externally threaded tubes. The first and second tubes include first and second tube flanges, with respective side walls of the respective boxes captured between a respective tube flange and abutment flange to direct electrical cable through the conduit structure between the electrical boxes.

2 Claims, 4 Drawing Sheets

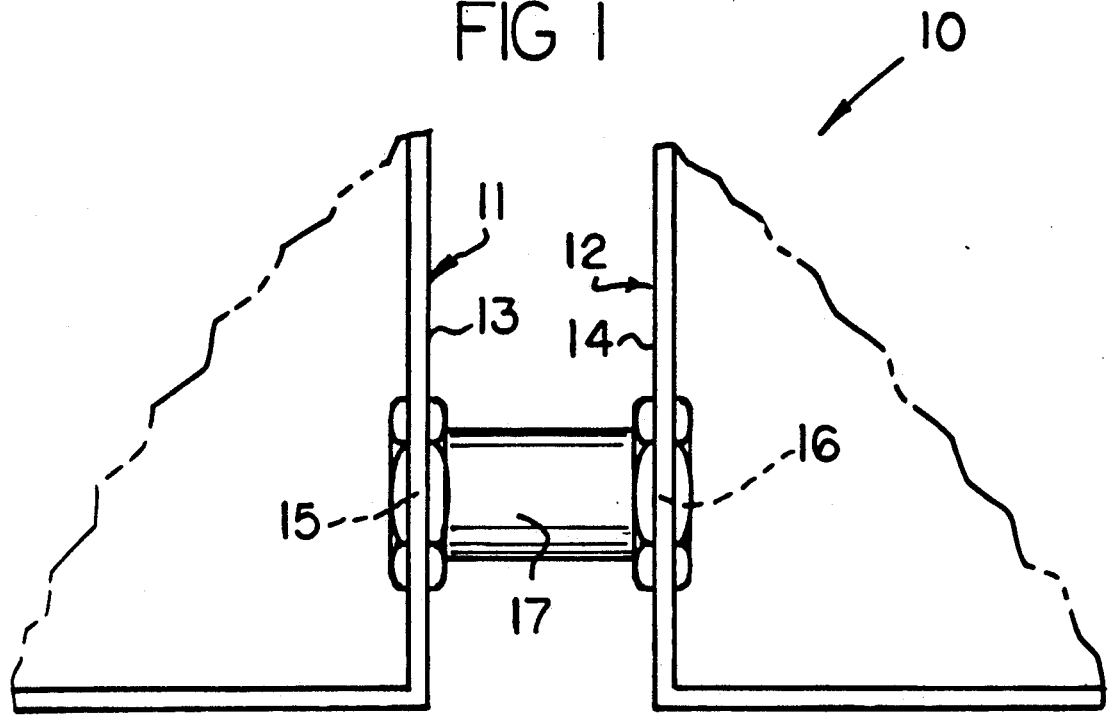
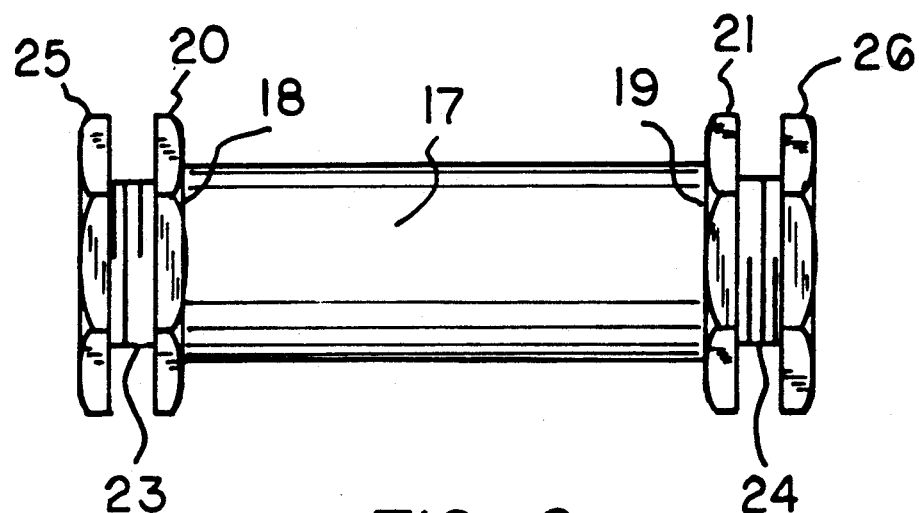

ELECTRICAL BOX CONNECTOR CONDUIT

BACKGROUND OF THE INVENTION

1. Field of the Invention

The field of invention relates to electrical conduit structure, and more particularly pertains to a new and improved electrical box connector conduit arranged to sealingly provide conduit structure for spaced electrical boxes.

2. Description of the Prior Art

Intercommunicating electrical wiring relative to adjacent boxes to accommodate various electrical codes is typically a time consuming and costly procedure, particularly of boxes in adjacency relative to one another. Boxes are typically of a myriad of constructions to include multiplicity of components and the like requiring the precise alignment and measuring to utilize such prior art connectors. Various electrical conduit connector structure is utilized in the prior art and exemplified by U.S. Pat. Nos. 4,159,134; 4,883,433; 4,019,762; 4,032,178; and 4,842,548.

The prior art has heretofore, however, failed to provide for the convenience and readily available interconnection structure as set forth by the instant invention addressing both the problems of ease of use as well as effectiveness in construction and in this respect, the present invention substantially fulfills this need.

SUMMARY OF THE INVENTION

In view of the foregoing disadvantages inherent in the known types of electrical box connector structure now present in the prior art, the present invention provides an electrical box connector conduit wherein the same is arranged to effect electrical communication between a plurality of electrical boxes. As such, the general purpose of the present invention, which will be described subsequently in greater detail, is to provide a new and improved electrical box connector conduit which has all the advantages of the prior art electrical box connector apparatus and none of the disadvantages.

To attain this, the present invention provides an electrical box connector conduit fixedly mounted between adjacent electrical boxes through aligned box bores. The conduit structure includes a central conduit member having first and second abutment flanges mounted fixedly to the first and second ends of the conduit member. The conduit member is internally threaded to threadedly receive first and second externally threaded tubes. The first and second tubes include first and second tube flanges, with respective side walls of the respective boxes captured between a respective tube flange and abutment flange to direct electrical cable through the conduit structure between the electrical boxes.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electrical box connector conduit which has all the advantages of the prior art electrical box connector apparatus and none of the disadvantages.

It is another object of the present invention to provide a new and improved electrical box connector conduit which may be easily and efficiently manufactured and marketed.

It is a further object of the present invention to provide a new and improved electrical box connector conduit which is of a durable and reliable construction.

An even further object of the present invention is to provide a new and improved electrical box connector conduit which is susceptible of a low cost of manufacture with regard to both materials and labor, and which accordingly is then susceptible of low prices of sale to the consuming public, thereby making such electrical box connector conduits economically available to the buying public.

Still yet another object of the present invention is to provide a new and improved electrical box connector conduit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of the invention in use.

FIG. 2 is an enlarged orthographic view of the invention.

DESCRIPTION OF THE PREFERRED EMBODIMENT

Figure 3:
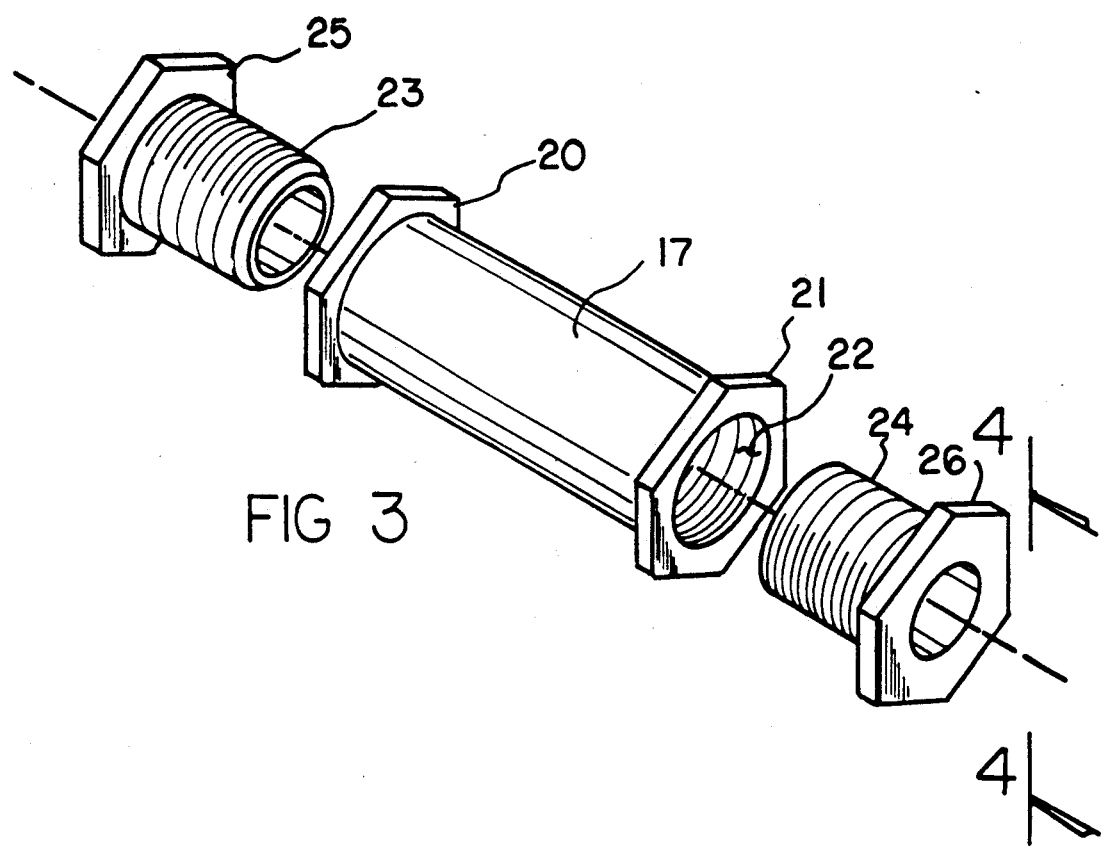
FIG. 3 is an isometric illustration of the invention.
Figure 4:
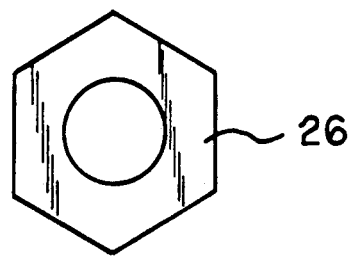
FIG. 4 is an orthographic end view, taken along the lines 4—4 of FIG. 3 in the direction indicated by the arrows.

With reference now to the drawings, and in particular to FIGS. 1 to 8 thereof, a new and improved electrical box connector conduit embodying the principles and concepts of the present invention and generally designated by the reference numeral 10 will be described.

More specifically, the electrical box connector conduit 10 of the instant invention essentially comprises communication and securement of a first electrical box 11 relative to a second electrical box 12 having respective first and second box side walls 13 and 14 which in turn include respective first and second side wall apertures 15 and 16 that are coaxially aligned relative to one another. A cylindrical conduit member 17 includes a conduit first end 18 spaced from a conduit second end, to include a respective first end abutment flange 20 and second end abutment flange 21 fixedly mounted to the first and second ends 18 and 19 projecting orthogonally and peripherally relative to the first and second ends, with the first and second end abutment flanges 20 and 21 each including respective first and second wrench flats to permit ease of securement of the first and second abutment flanges 20 and 21 in a coupling relative to the boxes 11 and 12. The cylindrical conduit member 17 has an internally threaded bore 22. Externally threaded first tube 23 and an externally threaded second tube 24 are threadedly directed into the cylindrical conduit 17 at the respective first and second ends 18 and 19. The first and second tubes 23 and 24 include respective first and second tube peripheral flanges 25 and 26 having respective third and fourth wrench flats formed peripherally at the sides of the flanges 25 and 26. The first and second box side walls 13 and 14 are thereby captured between cooperating pairs of flanges 20-25 and 26-21. Rotation of the first and second flanges 25 and 26 and the respective tubes 23 and 24 further assist in the alignment of the electrical boxes relative to one another to coaxially align the respective first and second side wall apertures 15 and 16.

Figure 5:
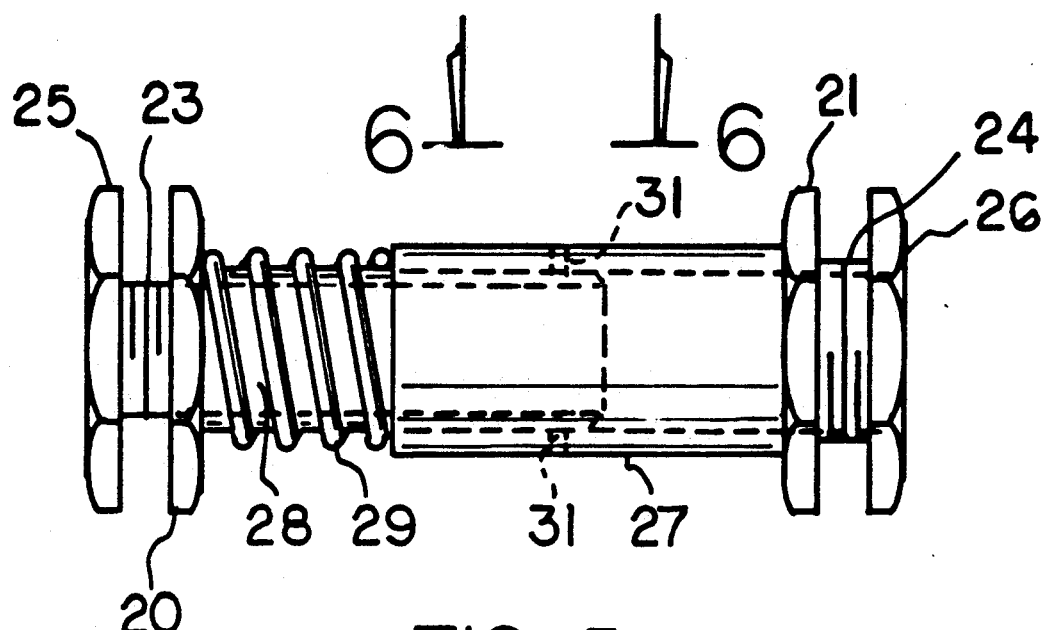
FIG. 5 is an orthographic view of a modified conduit member utilized by the invention.
Figure 6:
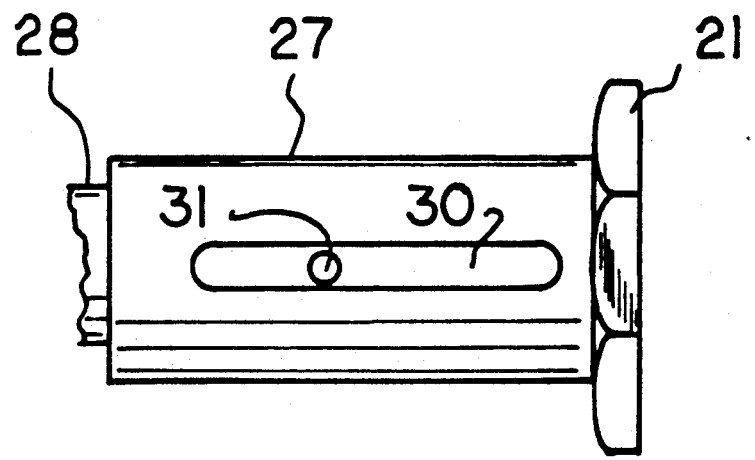
FIG. 6 is an orthographic view, taken along the lines 6—6 of FIG. 5 in the direction indicated by the arrows.

The FIGS. 5 and 6 illustrate the use of modified conduit structure having respective first cylindrical conduit 27 having an internally threaded structure telescopingly receiving a second cylindrical conduit 28. The second end abutment flange 21 is fixedly mounted to the first cylindrical conduit 27 at a first end thereof, with the second cylindrical conduit 28 including the first end abutment flange 20 fixedly mounted thereto. The first and second abutment flanges 20 and 21 are accordingly in a parallel relationship relative to one another, with a spring member 29 captured between a second end of the first cylindrical conduit 27 and the first end abutment flange 20. Diametrical slots 30 (see FIG. 6) are directed into the side wall of the first cylindrical conduit 27 to each receive a second cylinder conduit guide rod 31 to limit reciprocation of the respective second cylindrical conduit 28 relative to the first cylindrical conduit 27. Biasing of the conduits relative to one another further enhances positioning of the conduit structure between fixed electrical boxes to permit ease of directing the respective first and second tubes 23 and 24 into the respective conduit structure, in a manner as illustrated in FIG. 5.

Figure 7:
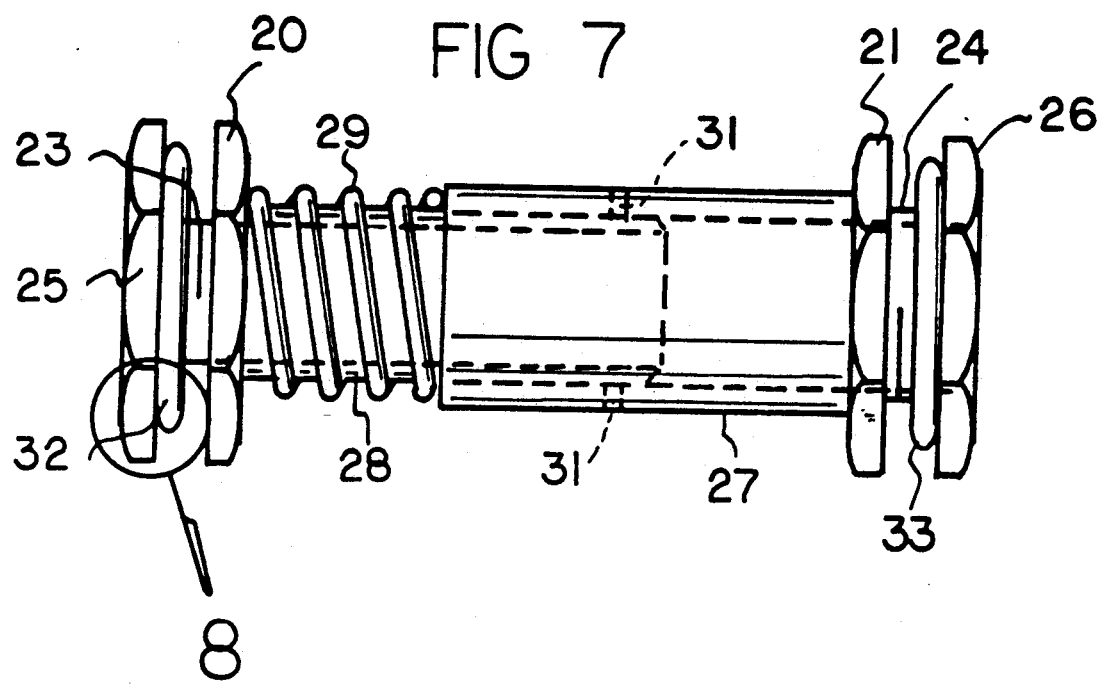
FIG. 7 is an orthographic view of a further modified connector conduit utilized by the invention.
Figure 8:
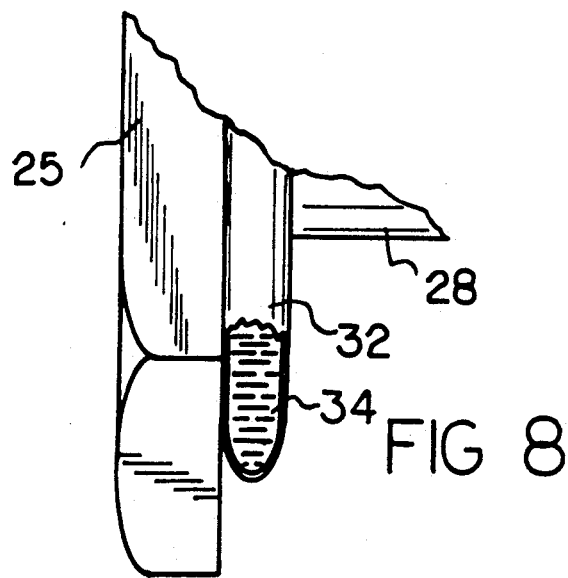
FIG. 8 is an enlarged orthographic view, partially in section, of section 8 as set forth in FIG. 7.

The FIG. 8 sets forth the structure to further include respective first and second torroidal capsules 32 and 33 mounted adjacent to the respective first and second tube peripheral flanges 25 and 26 about the respective first and second tubes 23 and 24. The capsules 32 and 33 each include a metallic fluid adhesive 34 contained therewithin having a matrix of electrically conductive metallic particles directed coextensively therethrough to enhance electrical grounding between the first and second electrical boxes 11 and 12 when the capsules 32 and 33 are burst when directed to securement relative to the electrical box structure captured between adjacent flanges, as illustrated in FIG. 7.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An electrical box connector conduit for securement of a first electrical box relative to a second electrical box, with the first electrical box having a first box side wall, the second electrical box having a second box side wall, a first side wall aperture directed through the first box side wall, and a second side wall aperture directed through the second box side wall, wherein the first side wall aperture and the second side wall aperture are coaxially aligned, wherein the connector conduit comprises, a cylindrical conduit means arranged for positioning between the first box side wall and the second box side wall coaxially aligned relative to the first side wall aperture and the second side wall aperture;

an externally threaded first tube arranged for projection to the first side wall aperture threadedly received within the conduit means and an externally threaded second tube directed through the second side wall aperture into the conduit means, with the first tube having a first tube peripheral flange fixedly and orthogonally mounted to the first tube extending peripherally thereof, and a second tube peripheral flange fixedly mounted to the second tube extending peripherally and orthogonally relative to the second tube;

the conduit means includes a first cylindrical conduit having an internally threaded bore threadedly receiving the first tube, and a second cylindrical conduit telescopingly received within the first cylindrical conduit having an internally threaded second cylindrical conduit bore threadedly receiving the second tube, wherein the first cylindrical conduit includes diametrically opposed slots arranged in a parallel coextensive relationship relative to one another, wherein each slot of the diametrically opposed slots includes a guide rod received therewithin, and each guide rod is fixedly mounted to the second cylindrical conduit; and the first cylindrical conduit includes a first end and the first end includes a first cylindrical conduit abutment flange fixedly mounted thereto, and the first cylindrical conduit including a second end, with the second end receiving the second cylindrical conduit therewithin, and the second cylindrical conduit including a second cylindrical conduit first end, with the second cylindrical conduit first end including a second cylindrical conduit flange fixedly mounted thereto, and a spring member captured between the second cylindrical conduit abutment flange and the first cylindrical conduit second end.

2. A connector conduit as set forth in claim 1 wherein the first tube and the second tube include a respective first torroidal capsule and second torroidal capsule mounted respectively thereto in adjacency relative to the respective first tube peripheral flange and the second tube peripheral flange, wherein each torroidal capsule of said first torroidal capsule and said second torroidal capsule include a fluid metallic adhesive contained therewithin to enhance securement to the respective first box side wall and second box side wall respectively and electrical grounding relative to the first box side wall and the second box side wall respectively.

* * * * *